(12) United States Patent
Streett et al.

(10) Patent No.: US 10,158,104 B1
(45) Date of Patent: Dec. 18, 2018

(54) POWER CELL CASING

(71) Applicant: SWIFT ENGINEERING, INC., San Clemente, CA (US)

(72) Inventors: Andrew Streett, San Clemente, CA (US); Matthew Barrientos, San Clemente, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 0 days.

(21) Appl. No.: 15/657,059

(22) Filed: Jul. 21, 2017

(51) Int. Cl.
H01M 2/10 (2006.01)

(52) U.S. Cl.
CPC .................... H01M 2/1016 (2013.01)

(58) Field of Classification Search
CPC ...... H01M 2/10; H01M 10/46; H01M 2/1005; H01M 2/1011; H01M 2/1016; H01M 2/1022; H01M 2/1027; H01M 2/1033; H01M 2/1038; H01M 2/1044; H01M 2/105; H01M 2/1055; H01M 2/1061; H01M 2/1066; H01M 2/1072; H01M 2220/10; H01M 2220/20; H01M 2/1077; H01M 2/1083; H01M 2/1088; H01M 2/1094
See application file for complete search history.

(56) References Cited

U.S. PATENT DOCUMENTS

| 3,420,032 | A | * | 1/1969 | Felt | E04C 3/07 228/136 |
| D382,736 | S | * | 8/1997 | Kopish | D25/126 |
| 2008/0169093 | A1 | * | 7/2008 | Ohfune | F28D 7/1684 165/164 |
| 2013/0098045 | A1 | * | 4/2013 | Binek | F04D 29/522 60/767 |

(Continued)

FOREIGN PATENT DOCUMENTS

JP 11303689 * 11/1999

OTHER PUBLICATIONS

AA Portable Power Corp, "LiFeMnPO4 Prismatic Battery and Charger Package: 48V, Choose from: 20Ah, 40Ah, 60Ah, or 100Ah—UN38.3 (12.8V×4 DGR)", http://www.batteryspace.com/lifepo4-prismatic-battery-and-charger-package-48v-choose-from-20-ah-40ah-60ah-or-100ah-un-38-3-passed-dgr.aspx, exact publication date unknown (web page last visited Oct. 13, 2017).

(Continued)

Primary Examiner — Muhammad S Siddiquee
(74) Attorney, Agent, or Firm — Perkins Coie LLP

(57) ABSTRACT

A casing for a battery assembly may include a first casing portion having a first base portion and a pair of first leg portions extending generally perpendicularly to the first base portion. At least one of the first leg portions may have a flared end. The casing may further include a second casing portion with a second base portion and a pair of second leg portions extending generally perpendicularly to the second (Continued)

base portion. At least one of the second leg portions may have a flat end. The casing portions are attached at a joint including the flat end attached to the flared end. In some embodiments, a battery assembly may include at least one power cell and a casing including a first casing portion and a second casing portion attached together at a joint. The joint may be under tension. The casing applies pressure to the power cell.

12 Claims, 7 Drawing Sheets

(56) References Cited

U.S. PATENT DOCUMENTS

| | | | |
|---|---|---|---|
| 2014/0349175 A1* | 11/2014 | Iwata | H01M 2/02 429/179 |
| 2015/0228957 A1* | 8/2015 | Jeong | B23K 31/02 429/158 |
| 2016/0197386 A1* | 7/2016 | Moon | H01M 2/1077 429/120 |
| 2017/0069900 A1* | 3/2017 | Casebolt | H01M 2/206 |

OTHER PUBLICATIONS

GoElectricDrive, "GoElectricDrive.com: A1234 video presenting prismatic battery pack—YouTube", https://www.youtube.com/watch?v=FSZ_THBQ0i4, Jun. 14, 2011.

Green Car Congress, "Li-ion maker Boston-Power launces module system for EV and ESS applications; no-weld integration (updated with graphic)", http://www.greencarcongress.com/2014/09/20140922-boston.html, Sep. 22, 2014.

Siegel, J., et al., "Expansion of Lithium Ion Pouch Cell Batteries: Observations from Neutron Imaging", Abstract, Journal of the Electrochemical Society, http://jes.ecsdl.org/content/160/8/A1031.abstract.

* cited by examiner

POWER CELL CASING

BACKGROUND

Battery assemblies typically include one or more power cells arranged in series or in parallel. Some power cells may include an electrolyte stored in a pouch and terminals (usually an anode and a cathode) for connecting external electronic components. Such power cells may be referred to as pouch cells. Recent advancements in power-cell technology and chemistry have increased the energy-density characteristics of power cells. As energy densities increase, the overall weight of a battery assembly required to power a device tends to decrease. Accordingly, power cells with high energy density have utility in aerospace technologies, communications, and commercial electronics, for example.

One drawback to some power cell technologies is that the power cells may heat and expand during charging or discharging. Over time, through cycles of charging and discharging, the anode or cathode may separate from the electrolyte material in the pouch, resulting in unreliable connections with the electrolyte and, potentially, failure of the power cell. To reduce the risk of degradation of the power cell due to cycles of expansion and contraction, pressure may be applied to the power cell to limit its expansion.

Current testing methods for some power-cell technologies involve large, heavy, and metallic structures arranged to restrain a power cell. These crude structures suffer from several drawbacks. For example, existing structures for restraining power cells are bulky, unwieldy, and may weigh as much as or even more than the power cells themselves. They also may not allow for even distribution of pressure. In extreme temperature environments, the metal components of existing structures expand and contract, altering the pressure applied to a power cell over time.

SUMMARY

Representative embodiments of the present technology include a battery assembly having at least one power cell and a casing including a first casing portion and a second casing portion. Each of the first casing portion and the second casing portion may have a base portion and a pair of leg portions extending generally perpendicular from the base portion. At least one leg portion of the first casing portion may have a flared end attached to an end of at least one leg portion of the second casing portion via a joint. The joint may be under tension. The casing applies pressure to the power cell.

Other representative embodiments of the present technology include a casing for a battery assembly. The casing may include a first casing portion having a first base portion and a pair of first leg portions extending generally perpendicularly to the first base portion. At least one of the first leg portions may have a flared end. The casing may further include a second casing portion with a second base portion and a pair of second leg portions extending generally perpendicularly to the second base portion. At least one of the second leg portions may have a flat end. The first casing portion and the second casing portion are attached at a joint including the flat end attached to the flared end.

Other representative embodiments of the present technology include a method of manufacturing a battery assembly. The method may include laying one or more first plies of composite material on or in a first mold, curing the one or more first plies to form a first casing portion having a first base portion and a pair of first leg portions extending perpendicularly from the first base portion, laying one or more second plies of composite material on or in a second mold, curing the one or more second plies to form a second casing portion having a second base portion and a pair of second leg portions extending perpendicularly from the second base portion, restraining at least one of the first casing portion or the second casing portion, layering one or more power cells in the at least one of the first casing portion or the second casing portion, pressing the first casing portion and the second casing portion together such that pressure is applied to the one or more power cells via the first casing portion and the second casing portion, and attaching the first casing portion to the second casing portion at a joint.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to power-cell casings, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to power cells, batteries, and composite materials, may not be shown or described in detail so as to avoid unnecessarily obscuring the relevant description of the various embodiments. Accordingly, embodiments of the present technology may include additional elements or exclude some of the elements described below with reference to FIGS. 1-8, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to batteries having pouch cells. The technology may also be used with other types of batteries or in other technology areas in which a casing or container that exerts mechanical pressure on its contents is desirable.

Figure 1:
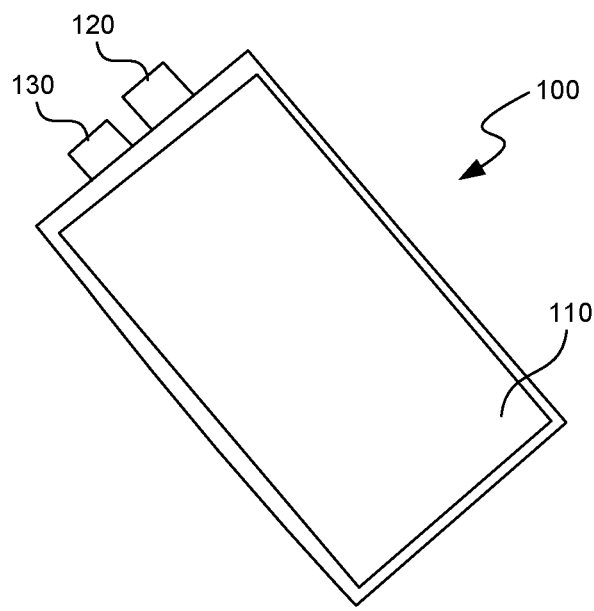
FIG. 1 illustrates a power cell or pouch cell in the prior art.

Turning now to the drawings, FIG. 1 illustrates a power cell 100 known in the art. The power cell 100 may include a pouch 110 containing an electrolyte or other suitable electrical energy storage substance. The power cell 100 may further include an anode 120 and a cathode 130 for conducting electrical energy from the electrolyte or other suitable electrical energy storage substance to an external device, such as other power cells 100, an electrically operated device, charging equipment, or other electrical circuitry or devices. The pouch 110 may be formed with a metal or metal alloy (such as aluminum), and it may be flexible or semi-flexible. Such power cells 100 may be known as pouch cells. Some power cells 100 may be rigid.

Figure 2:
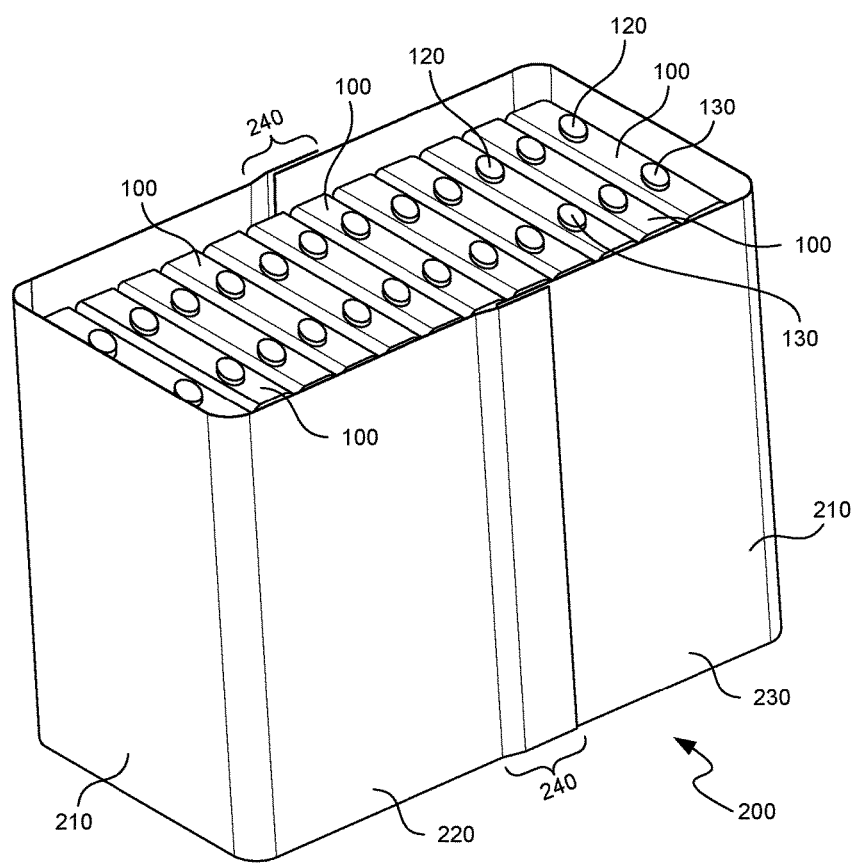
FIG. 2 illustrates a battery assembly according to an embodiment of the present technology.

FIG. 2 illustrates a battery assembly 200 according to an embodiment of the present technology. One or more power cells 100 (for example, twelve power cells 100) are contained in a casing 210. The casing 210 may include a first casing portion 220 attached to a second casing portion 230. The anodes 120 and cathodes 130 of the power cells 100 may be positioned to be connected to each other (via suitable wiring) or to a circuit board or other suitable electronic elements. According to some embodiments of the present technology, the power cells 100 are compressed together inside the casing 210 when the first casing portion 220 is joined to the second casing portion 230. For example, the first casing portion 220 may be pressed over, and into intimate contact with, the second casing portion 230. The first casing portion 220 is attached to the second casing portion 230 at joints 240 on opposing sides of the casing 210.

Figure 3:
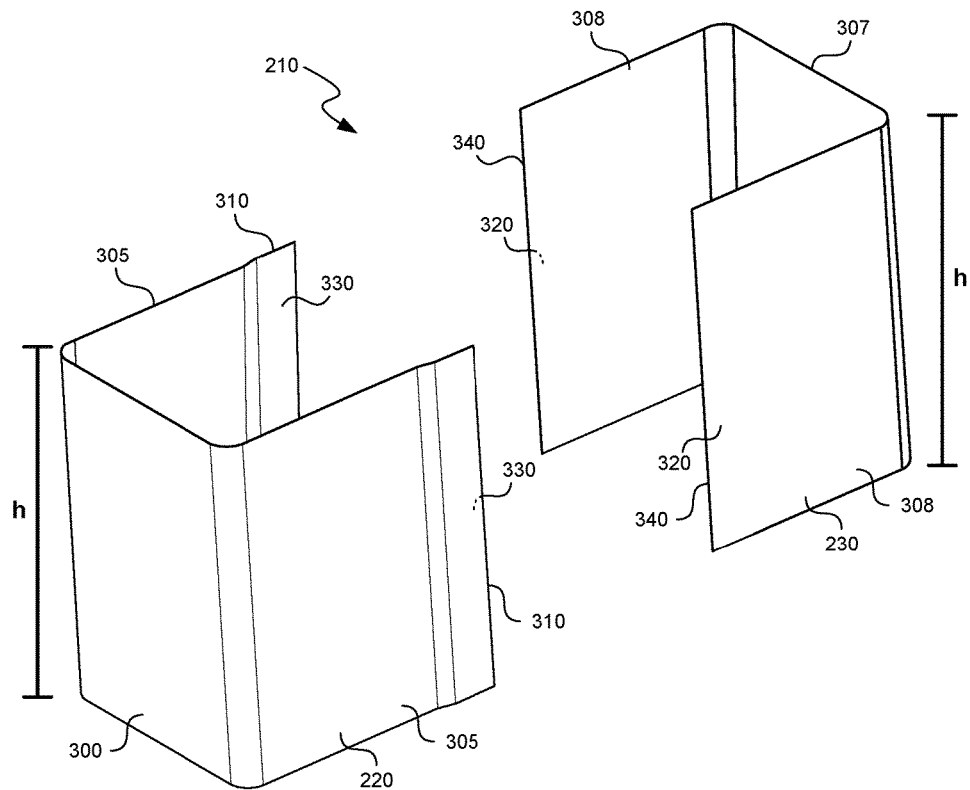
FIG. 3 illustrates an exploded perspective view of the casing illustrated in FIG. 2 in accordance with an embodiment of the present technology.

As shown in FIG. 3, the first casing portion 220 may be a generally C-shaped channel having a first base side or first base portion 300 sized to be approximately as wide as a power cell 100 (see FIGS. 1 and 2). The first casing portion 220 further includes two leg portions 305 extending generally perpendicularly from the first base portion 300, and one or more flared ends 310 on the leg portions 305. The flared ends 310 may extend wider than a width of the first base portion 300.

The second casing portion 230 may also be a generally C-shaped channel having a second base side or second base portion 307 sized to be approximately as wide as a power cell 100. The second casing portion 230 further includes two leg portions 308 extending generally perpendicularly from the second base portion 307. The leg portions 308 may include straight or flat ends 340 that may be configured to interface with the flared ends 310 of the first casing portion 220 when aligned parallel to the flared ends 310 in an assembled casing 210. In some embodiments, the casing portions 220, 230 have a height h equal to or greater than an overall height of each power cell 100. In other embodiments, the casing portions 220, 230 may be shorter than the power cells 100.

The joint 240 (see FIG. 2) may be formed by applying an adhesive material to one or more outer surfaces 320 of the second casing portion 230, or to one or more inner surfaces 330 of the first casing portion 220, or to a combination of these surfaces, and by bringing the first casing portion 220 into intimate contact with the second casing portion 230, as described in detail below (under pressure until the adhesive cures). In some embodiments, the joint 240 may be formed with one or more fasteners in addition to or as an alternative to adhesive material. For example, the first casing portion 220 or the second casing portion 230 may be held together using one or more magnets, hook-and-loop fasteners (such as Velcro®), or other fasteners suitable for maintaining connection in the joint 240, such as rivets, clips, or straps (such as encompassing straps). In some embodiments, the casing portions 220, 230 may not include flared ends, such that the leg portions 305, 308 may have other end configurations suitable for various types of joints and combinations of types of joints, as described in additional detail below.

In some embodiments, the adhesive may include an epoxy material, such as a temperature-resistant or aerospace-grade epoxy. In general, embodiments of the present technology may employ any adhesive suitable for holding the casing portions 220, 230 together. For example, a suitable adhesive may have strong shear strength throughout a wide temperature range. In some embodiments, adhesives from the Henkel® company, such as Loctite® or Hysol®, or adhesives currently known under model numbers EA 9394, EA 9396, or EA 9330, may be used to join the casing portions 220, 230 at the joint 240, depending on the desired temperature and strength characteristics.

The first casing portion 220 and the second casing portion 230 may be formed using composite materials including carbon fiber, fiberglass, Kevlar® or other aramid fibers, boron fiber, or other suitable fibers or combinations of fibers in a suitable matrix material. For example, matrix materials may include resin, epoxy, or other materials suitable for forming a composite material or laminate. In some embodiments, the composite materials may have high temperature resistance. In some embodiments, the first casing portion 220 and the second casing portion 230 may be formed from a single layer of composite laminate, while in other embodiments, the casing portions 220, 230 may be formed using more than one layer of composite laminate, depending on the strength or other relevant characteristics of the composite material. The first casing portion 220 and the second casing portion 230 may be, but need not be, formed using the same materials as each other.

In some embodiments, one or both of the casing portions 220, 230 may include stiffening elements. For example, one or both of the casing portions 220, 230 may include ribs or other protrusions suitable for increasing structural stiffness. Such stiffening elements may be integral with the casing portions 220, 230 or attached to the casing portions 220, 230. In some embodiments, the stiffening elements may be formed during the layup, molding, or other construction processes used to form the casing portions 220, 230. For example, the stiffening elements may be bumps or shapes in the material forming the casing portions 220, 230. In some embodiments, the stiffening elements may be separate elements glued or otherwise suitably affixed to the casing portions 220, 230.

Figure 3A:
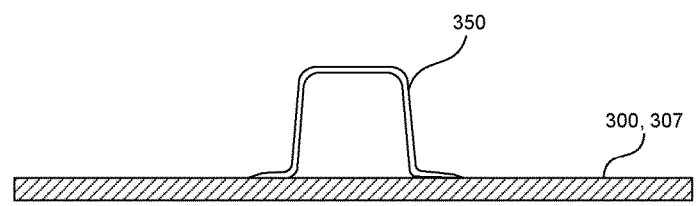
FIG. 3A illustrates a side cross-sectional view of a portion of a casing and a stiffening element in accordance with an embodiment of the present technology.

As shown in FIG. 3A, a representative stiffening element according to an embodiment of the present technology may include a hat-section stiffener. For example, a hat-section stiffener 350 may be attached to the first base portion 300 or the second base portion 307, or to both base portions 300, 307. The hat-section stiffener 350 may be oriented along the height h (see FIG. 3) of the casing, it may be transverse to the height h, or it may be oriented at another suitable angle relative to the casing. Although only one hat-section stiffener 350 is illustrated, any suitable number of hat-section stiffeners 350 may be used to increase stiffness in the casing. In some embodiments, stiffening elements such as the hat-section stiffener 350 may be positioned on one or more of the leg portions 305, 308. In other embodiments, an L-section or T-section stiffener, or other suitable stiffening elements, may be used on various portions of the casing.

Figure 4:
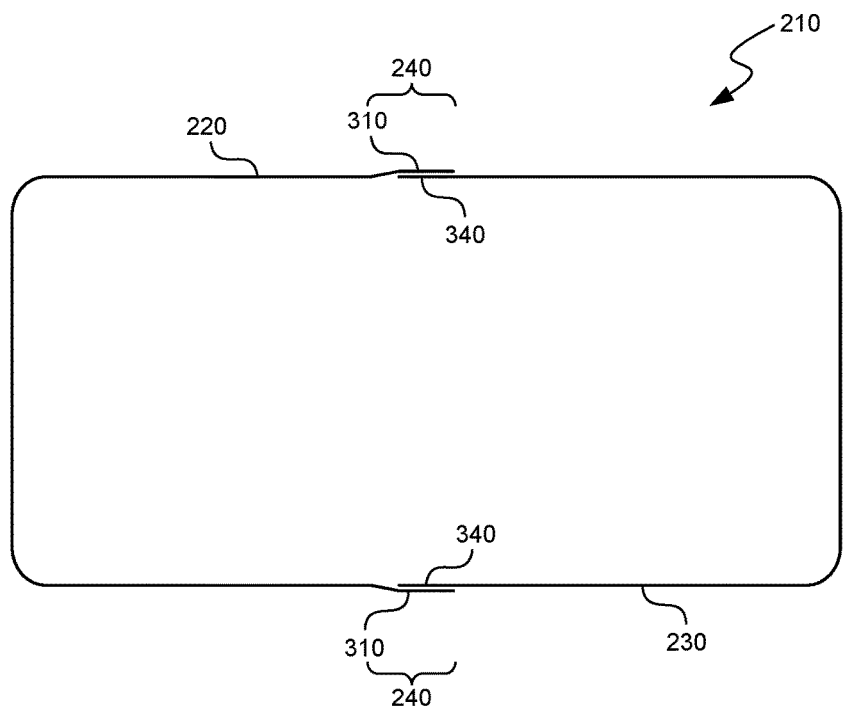
FIG. 4 illustrates a top or bottom view of the casing illustrated in FIGS. 2 and 3.

As shown in FIG. 4, the joint 240 includes flared ends 310 of the first casing portion 220 overlapping the flat ends 340 of the second casing portion 230. Although FIG. 4 illustrates a gap between the flared ends 310 of the first casing portion 220 and the flat ends 340 of the second casing portion 230, such a gap may be filled with adhesive or the ends 310, 340 would be in generally intimate, bonded, or otherwise fastened contact in an assembled casing 210.

Figure 5:
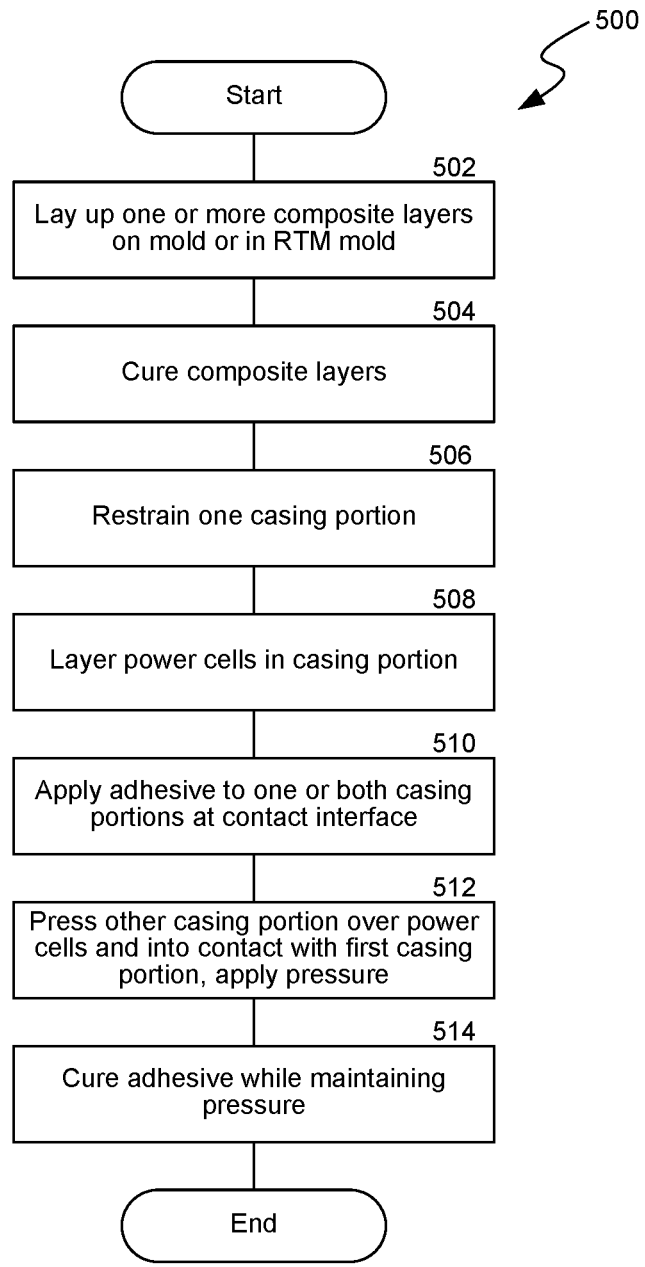
FIG. 5 illustrates a flowchart of a method of manufacturing a battery assembly having a casing according to an embodiment of the present technology.

FIG. 5 illustrates a flowchart 500 of a method of manufacturing a battery assembly having a casing (such as the casing 210 described above with regard to FIGS. 2-4) according to an embodiment of the present technology. The method may include using a mold formed in the shape of the casing portions 220, 230, or it may include other suitable methods of forming composite materials, such as resin transfer molding (RTM) processes. In block 502, a manufacturer may lay up one or more composite plies or layers (using wet layup or pre-preg composite materials in a mold, or an RTM process, for example). Then, in block 504, a manufacturer may cure the composite layers into the permanent shape of the casing portions 220, 230.

To make the battery assembly (such as assembly 200 shown in FIG. 2), beginning in block 506, a manufacturer may restrain one of the casing portions 220, 230 in a vise or other suitable holder. In block 508, a manufacturer may then layer one or more power cells 100 into the restrained casing portion (220 or 230). In block 510, a manufacturer may apply the adhesive material to one or both of the casing portions 220, 230 at the surfaces forming the joint 240. For example, the manufacturer may apply the adhesive material to one or more outer surfaces 320 of the second casing portion 230, or to one or more inner surfaces 330 of the first casing portion 220, or to a combination of these surfaces. In block 512, the manufacturer may press the other, unrestrained casing portion (220 or 230) over the one or more power cells 100 and into contact with the restrained casing portion to form the joint 240. At this point, pressure may be applied to the casing portions 220, 230 to cause them to compress against the power cells 100. In block 514, the adhesive is cured while maintaining pressure.

Pressure applied to the casing portions 220, 230 while the adhesive cures provides a preload of tension in the joint 240 and in the casing portions 220, 230 that keeps the assembled casing 210 tight against the power cells 100 and keeps the power cells 100 tight against each other. The tensile preload prevents overexpansion of the power cells 100. The tensile load may be sufficiently high that it also holds the power cells 100 together if they contract.

The amount of pressure or tension preload in the joint 240 may vary with specific applications and configurations of embodiments of the technology. For example, more power cells 100 in a battery assembly 200 may call for additional tension preload in the joint 240. If a thin, weak, or stretchable material is used to form the casing portions 220, 230, there may be less tension preload in the joint 240. One of ordinary skill in the art of composites and adhesive will understand how much tension preload should be formed in the joint 240 based on several factors, for example, the operating requirements of the battery assembly 200, the number of power cells 100, the expansion characteristics of individual power cells 100, and other factors. In some embodiments, the amount of pressure applied to the one or more power cells 100 in a battery assembly 200 may be between 10 and 1000 pounds per square inch. Embodiments of the present technology provide uniform pressure distribution across the cells. In some embodiments, power cells may not be flat where they interface with other power cells or parts of the casing. In such embodiments, fillers may be included in the casing 210 with the power cells 100 to further improve pressure distribution. Examples of filler material include materials having constant spring rate or constant dampening characteristics, or other material suitable for improving pressure distribution.

In some embodiments, the casing portions may be compressed together around the power cells before adding adhesive to the joint. For example, there may be holes in an outer layer of the joint or a channel at an end of the joint, into which adhesive may be injected (injection bonding).

Figure 6:
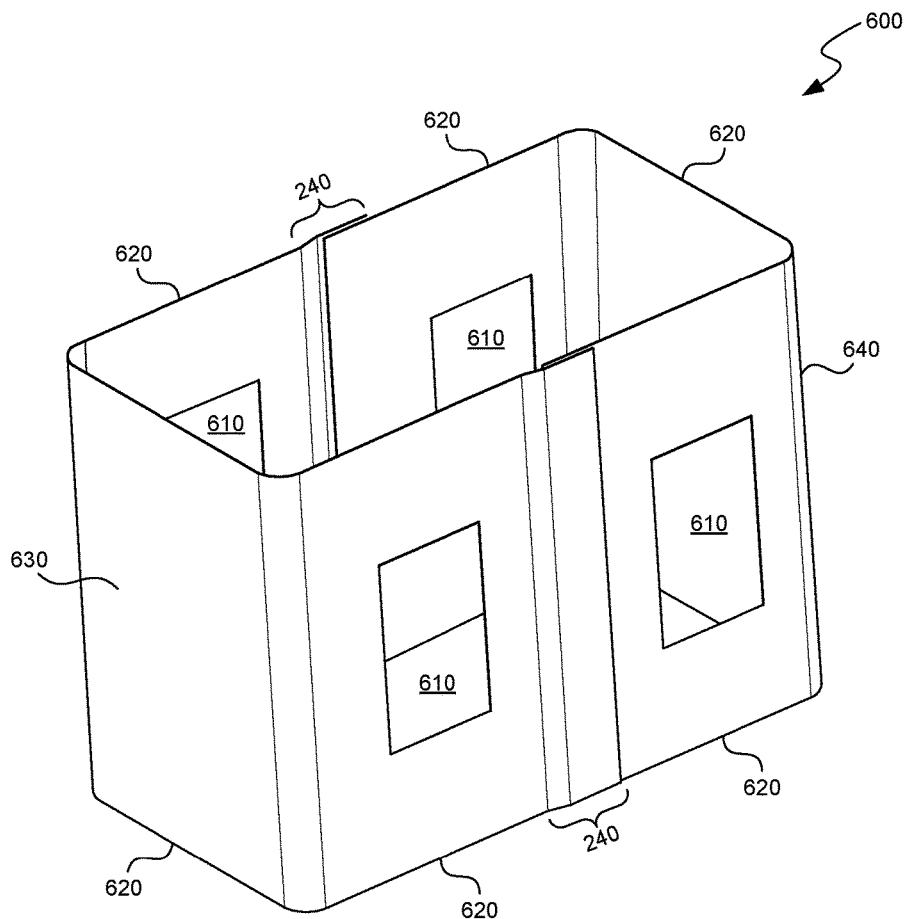
FIG. 6 illustrates a casing in accordance with another embodiment of the present technology.

FIG. 6 illustrates a casing 600 in accordance with another embodiment of the present technology. The casing 600 is generally similar to the casing 210 illustrated and described above with regard to FIGS. 2-5, except that it may further include cutouts or openings 610 in one or more walls 620 of the first casing portion 630 or the second casing portion 640. For example, there may be two cutouts or openings 610 in each of the casing portions 630, 640. The openings 610 may reduce weight while maintaining structural integrity of the assembled casing 600. In some embodiments, the openings 610 may be cut out of cured casing portions 630, 640. In other embodiments, the openings 610 may be formed as part of the composite layup manufacturing process used to make the casing portions 630, 640.

In some embodiments of the present technology, an insulating material, such as a dielectric material or another suitable insulator, may be attached to an interior surface of a casing (such as a casing 210 in FIGS. 2-4 or a casing 600 in FIG. 6, or other embodiments). The insulating material may prevent direct contact between the casing and the power cells or parts of the power cells. The insulating material may prevent the flow of energy from the power cells 100 to the materials forming the casing. In some embodiments, the insulating material may be added to the composite layup forming the casing portions (such as embodiments using fiberglass or Kevlar® aramid fibers) and cured into the layup. In other embodiments, the insulating material may be added to the composite layup after the composite has cured.

Figure 7:
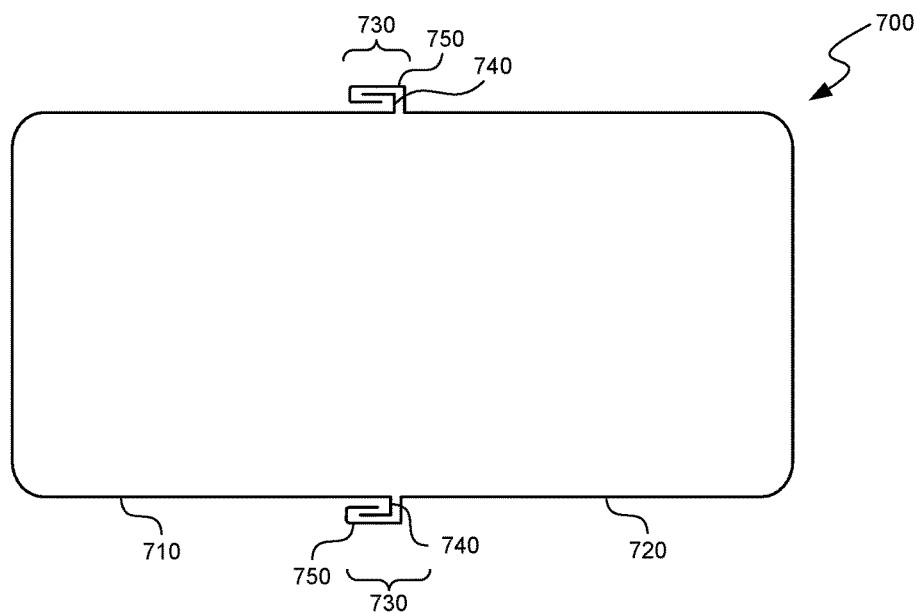
FIG. 7 illustrates a top or bottom view of a casing according to another embodiment of the present technology.

In some embodiments of the present technology, the joint between casing portions (such as the joint 240) may be formed using other joints or interfaces suitable for joining parts together and holding them together under a preloaded stress or tension. For example, in some embodiments, the joint 240 may include a butt joint, a dovetail joint, or other suitable joints. As shown in FIG. 7, a casing 700 may include a first casing portion 710 and a second casing portion 720 joined together at a joint 730. The first casing portion 710 may include a first hook 740 that interfaces with a second hook 750 on the second casing portion 720. The first casing portion 710 may slide relative to the second casing portion 720 (for example, into and out of the illustration in FIG. 7) to lock the joint 730, with or without adhesive. The casing portions 710, 720 and the joint 730 may be sized and shaped to provide pressure on any power cells contained in the casing 700.

Figure 8:
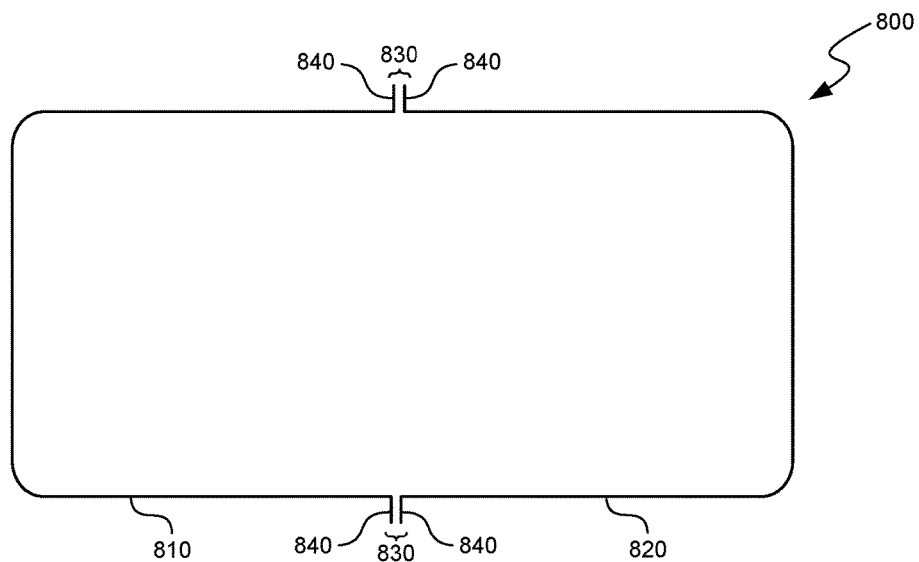
FIG. 8 illustrates a top or bottom view of a casing according to another embodiment of the present technology.

As shown in FIG. 8, a casing 800 may include a first casing portion 810 and a second casing portion 820 joined together at a flanged joint 830. Each of the first casing portion 810 and the second casing portion 820 may include flanges 840 attached to each other with a suitable adhesive or mechanical fastener (such as a bolt, rivet, staple, or other suitable fastener). The casing portions 810, 820, and the joint 830 may be sized and shaped to provide pressure on any power cells contained in the casing 800.

The present technology provides a stiff and lightweight casing for power cells that is resistant to changes in temperature or to temperature extremes. The present technology also requires reduced or minimal assembly. The present technology may also be scaled up or down in size and strength depending on the intended application and cost. For example, any number of suitable composite laminate layers may be used to form the casing portions to dictate the stiffness, strength, thickness, or weight of a casing. Various dimensions may be scaled up or down depending on the size and amount of power cells intended to be held in the casing. In some embodiments, a single casing design may be used with varying numbers of cells because it may be compressed or spread apart as needed. In some embodiments, the adhesive for the joint 240 may be applied before loading power cells into either casing portion.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, in some embodiments of the present technology, the casing may include a top cover, a bottom cover, or both a top and a bottom cover. Although FIGS. 2-4 and 6-8 show casing portions (such as 220, 230, 630, 640) with rounded or beveled edges or corners between adjacent sides, the corners need not be rounded or beveled and may instead be sharp, perpendicular, or have other configurations. In some embodiments, a casing may be made by attaching the casing portions together without installing power cells. Although the figures illustrate joints spanning a full height h of the casing (see FIG. 3), various joints according to embodiments of the technology may only span a portion of the height h of the casing. For example, there may be three joint portions distributed along the height h, or there may be two joint portions with one positioned at a top of the height h and another at the bottom of the height h. In some embodiments, rather than pressing casing portions together, they may be slid relative to each other along the length of the joint (as long as the assembled casing maintains pressure on any power cells therein).

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A battery assembly comprising:
a plurality of power cells; and
a casing comprising a first casing portion and a second casing portion, each of the first casing portion and the second casing portion having a base portion and a pair of leg portions extending generally perpendicular from the base portion; wherein
at least one leg portion of the first casing portion comprises a flared end attached to an end of at least one leg portion of the second casing portion via a joint; and wherein
the joint is under tension to compress adjacent power cells against each other inside the casing.

2. The battery assembly of claim 1 wherein the joint comprises adhesive.

3. The battery assembly of claim 1 wherein at least one of the first casing portion or the second casing portion comprises a cutout in one or more of the leg portions.

4. The battery assembly of claim 1 wherein a height of at least one of the first casing portion and the second casing portion is greater than a height of at least one of the power cells.

5. The battery assembly of claim 1 wherein at least one of the first casing portion or the second casing portion comprises composite material.

6. The battery assembly of claim 5 wherein the composite material comprises at least one of carbon fiber, fiberglass, or aramid fiber.

7. The battery assembly of claim 5 wherein the composite material comprises a plurality of composite plies.

8. A casing for a battery assembly, the casing comprising:
a first casing portion comprising a first base portion and a pair of first leg portions extending generally perpendicularly to the first base portion, wherein at least one of the first leg portions comprises a flared end; and
a second casing portion comprising a second base portion and a pair of second leg portions extending generally perpendicularly to the second base portion, wherein at least one of the second leg portions comprises a flat end; wherein
the first casing portion and the second casing portion are attached at a joint, the joint comprising the flat end attached to the flared end; and wherein
the joint is under tension and configured to cause the first casing portion and the second casing portion to press adjacent power cells against each other between the first and second casing portions.

9. The casing of claim 8 wherein the flat end is attached to the flared end with an adhesive.

10. The casing of claim 8 wherein at least one of the first casing portion or the second casing portion comprises a cutout in one or more of the leg portions.

11. The casing of claim 8 wherein at least one of the first casing portion or the second casing portion comprises composite material.

12. The casing of claim 11 wherein the composite material comprises a plurality of composite plies.

\* \* \* \* \*